United States Patent
Haraguchi et al.

(10) Patent No.: US 9,715,225 B2
(45) Date of Patent: Jul. 25, 2017

(54) NUMERICAL CONTROLLER FOR SMOOTHING TOOL PATH IN OPERATION BASED ON TABLE FORMAT DATA

(71) Applicant: FANUC Corporation, Minamitsuru-gun, Yamanashi (JP)

(72) Inventors: Takahiro Haraguchi, Minamitsuru-gun (JP); Yasushi Takeuchi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 362 days.

(21) Appl. No.: 14/572,982

(22) Filed: Dec. 17, 2014

(65) Prior Publication Data
US 2015/0177728 A1 Jun. 25, 2015

(30) Foreign Application Priority Data
Dec. 24, 2013 (JP) .................................. 2013-265636

(51) Int. Cl.
G05B 19/19 (2006.01)
(52) U.S. Cl.
CPC .... *G05B 19/19* (2013.01); *G05B 2219/36342* (2013.01)
(58) Field of Classification Search
CPC ...................... G05B 19/19; G05B 2219/36342
USPC ................................................. 700/186, 193
See application file for complete search history.

(56) References Cited

U.S. PATENT DOCUMENTS

| 4,692,856 | A | 9/1987 | Komiya | |
| 7,206,659 | B2 * | 4/2007 | Hosokawa | G05B 19/404 700/159 |
| 7,274,165 | B2 * | 9/2007 | Takeuchi | G05B 19/404 318/567 |
| 7,480,541 | B2 * | 1/2009 | Endo | G05B 19/414 318/600 |
| 9,310,799 | B2 * | 4/2016 | Takeuchi | G05B 19/4155 |
| 2003/0191553 | A1 | 10/2003 | Isohata | |
| 2006/0229761 | A1 * | 10/2006 | Kita | G05B 19/4068 700/181 |

(Continued)

FOREIGN PATENT DOCUMENTS

| CN | 101017375 A | 8/2007 |
| CN | 101620430 A | 1/2010 |

(Continued)

OTHER PUBLICATIONS

The Notification of First Office Action issued Dec. 2, 2016 in Chinese Patent Application No. 2014108149423 (5 pages) with an English Translation (7 pages).
(Continued)

*Primary Examiner* — Chun Cao
(74) *Attorney, Agent, or Firm* — Drinker Biddle & Reath LLP

(57) ABSTRACT

Positions to be synchronized with a reference value are stored as command data in table format. Velocity changing points of a tool path designated by the table format data are calculated. Two intersection points between the tool path and a circle or a sphere having a designated radius and centered on the velocity changing point are connected by a smooth curved tool path according to a multidimensional function or the like. In this way, the table format data is corrected.

16 Claims, 7 Drawing Sheets

(56) References Cited

U.S. PATENT DOCUMENTS

| | | | |
|---|---|---|---|
| 2007/0185609 A1 | 8/2007 | Endo et al. | |
| 2010/0004760 A1 | 1/2010 | Endo et al. | |
| 2012/0215334 A1 | 8/2012 | Tanuma et al. | |
| 2012/0283879 A1 | 11/2012 | Takeuchi et al. | |
| 2015/0142166 A1* | 5/2015 | Kanemaru | G05B 19/402 700/186 |

FOREIGN PATENT DOCUMENTS

| | | | |
|---|---|---|---|
| JP | S59-177604 A | | 10/1984 |
| JP | 363024303 | * | 2/1988 |
| JP | H01-106107 A | | 4/1989 |
| JP | H03-14004 A | | 1/1991 |
| JP | H08-185211 A | | 7/1996 |
| JP | H10-198411 A | | 7/1998 |
| JP | 2003-303005 A | | 10/2003 |
| JP | 2007-304714 A | | 11/2007 |
| JP | 2012-234445 A | | 11/2012 |
| WO | WO 2011-052800 A1 | | 5/2011 |

OTHER PUBLICATIONS

Decision to Grant a Patent issued Aug. 4, 2015 in Japanese Patent Application No. 2013-265636 (3 pages) with an English Translation (3 pages).

* cited by examiner

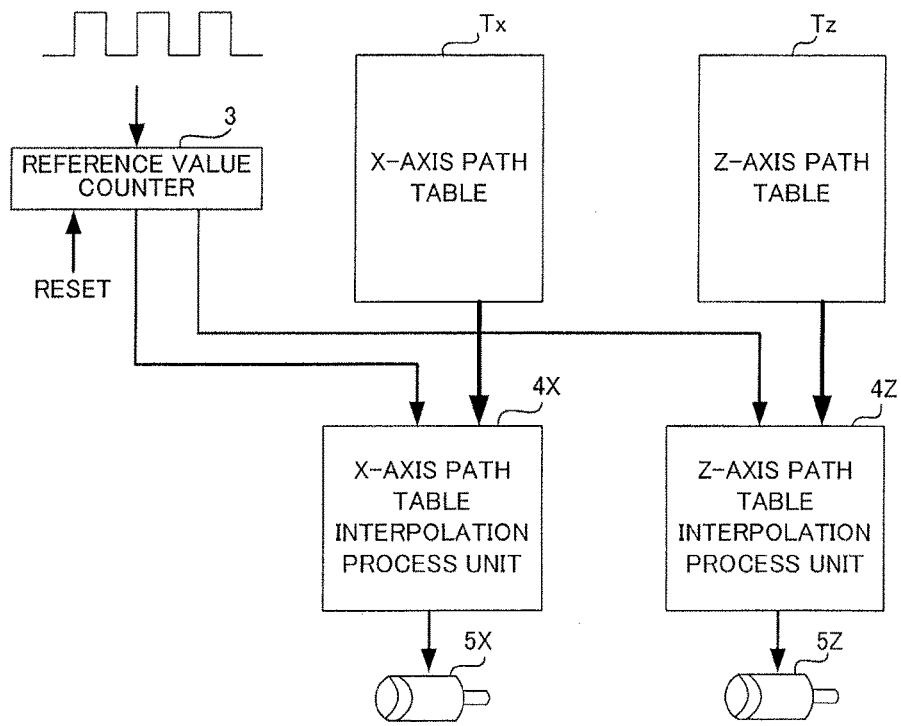

| REFERENCE VALUE L | X-AXIS POSITION COMMAND |
|---|---|
| 0.0 | 0.000 |
| CONSTANT VELOCITY | |
| REFERENCE VALUE AT INTERSECTION POINT 1 95.0248140·· | X-AXIS POSITION COMMAND AT INTERSECTION POINT 1 0.1900496·· |
| CUBIC FUNCTION | |
| REFERENCE VALUE AT INTERSECTION POINT 2 102.9061910·· | X-AXIS POSITION COMMAND AT INTERSECTION POINT 2 0.2813733·· 0.0 |
| CONSTANT VELOCITY | |
| 150.000 | 1.600 |

NUMERICAL CONTROLLER FOR SMOOTHING TOOL PATH IN OPERATION BASED ON TABLE FORMAT DATA

RELATED APPLICATION DATA

This application claims priority under 35 U.S.C. §119 and/or §365 to Japanese Application No. 2013-265636 filed Dec. 24, 2013, the entire contents is incorporated herein by reference.

BACKGROUND OF THE INVENTION

1. Field of the Invention

The present invention relates to a numerical controller for controlling machine tools and various industrial machines, and more particularly, to a numerical controller for controlling a machine tool and the like based on table format data.

2. Description of the Related Art

There is known a numerical control method (so-called electronic cam control) of machine tools, in which a feed axis position and a spindle position synchronized with reference values are stored in a memory in a table form as command data so as to correspond to the reference values rather than commands from respective blocks of a NC program, to control the feed axis position, the spindle position, and the like, based on the table format data stored in the memory. In operations based on table format data, the position of a axis synchronized with a reference value can be controlled accurately even when the speed of advance of the reference value changes, and a tool can operate freely regardless of a machining program unlike the conventional method. In this way, machining time is reduced and machining accuracy is improved. Time, a feed axis position or a spindle position, and the like are used as the reference values (see Japanese Patent Application Publication No. S59-177604). Further, a control method in which command positions in the table format data are connected by quadratic, cubic, quartic, and quintic functions so as to prevent shocks and vibration in machines is also known (see Japanese Patent Application Publication No. 2003-303005 and Japanese Patent Application Publication No. 2007-304714).

Moreover, a control method in which the same reference values are used in the table format data of each axis to be controlled and different reference values are used for respective items of task objects is also known (see Japanese Patent Application Publication No. 2012-234445). Further, Japanese Patent Application Publication No. 2012-234445 also discloses a method in which, when a machine tool is operated based on table format data and an operation of a machine tool to be controlled lags, standby of respective control axes and the like is performed, so that the control axes and the like are controlled in a synchronized manner.

In table format data-based operations, when the accuracy of the table format data output by a CAM is poor, the velocity between respective command positions changes greatly, and it may be difficult to process a machining surface smoothly.

FIG. 1 is a block diagram of table format data-based operations known in the conventional art (disclosed in Japanese Patent Application Publication No. 2003-303005 and Japanese Patent Application Publication No. 2007-304714). In the example illustrated in FIG. 1, X and Z axes are synchronized with reference values. A numerical controller that performs operations based on command data stored as table format data includes a reference value counter 3 that counts signals that form a reference value such as time, a spindle position, and a feed axis position, an X-axis path table Tx, a Z-axis path table Tz, an X-axis path table interpolation process unit 4x, a Z-axis path table interpolation process unit 4z, a feed axis X-axis servo motor 5x, and a feed axis Z-axis servo motor 5z. The X-axis path table Tx and the Z-axis path table Tz are provided in a memory in a numerical controller or a storage device connected to the numerical controller via a network. The X-axis position corresponding to a reference value as command data and the Z-axis position corresponding to the reference value are set and stored in the X-axis path table Tx and the Z-axis path table Tz as table format data, respectively. Hereinafter, the command data stored in the respective axis path tables will be referred to as path table data. The X-axis path table interpolation process unit 4x and the Z-axis path table interpolation process unit 4z read table format data stored in the X-axis path table Tx and the Z-axis path table Tz based on a reference value which is an input value of the reference value counter 3, performs an interpolation process, and outputs the interpolated table format data to the X-axis servo motor 5x and the Z-axis servo motor 5z so that the X-axis and Z-axis servo motors 5x and 5z are driven with the X-axis and Z-axis positions synchronized with the reference value.

For example, when such path table data as illustrated in FIG. 2 is stored in the X-axis path table Tx and the Z-axis path table Tz and a work piece is processed by a machine tool which is controlled based on the path table data by a numerical controller, the tool path follows such a path as illustrated in FIG. 3.

The X-axis position and the Z-axis position are at the point of origin "0.000" when the reference value is L=0.0, and the X and Z axes are driven so that the X-axis position moves from the point of origin to reach the position "0.200" when the reference value reaches L=100.0 and the Z-axis position moves from the point of origin to reach the position "3.000" when the reference value reaches L=150.0. As a result, at the point in time when the reference value reaches L=100.0, the X-axis position is "0.200" and the Z-axis position reaches the position "2.000" in the course of moving so as to reach the position "3.000" when the reference value is L=150.0. That is, the X-axis and Z-axis positions reach P1(X,Z)=(0.200,2.000) at the reference value L=100.0. The X-axis is driven so that the X-axis position moves from the position P1 to reach the position "3.000" at the reference value L=200.0 and to reach the position "1.600" at the position P2 corresponding to the reference value L=150.0 at which the Z-axis position reaches the target position "3.000". The Z-axis is driven so that the Z-axis position moves from the position P2 to reach the position "0.000" at the reference value L=200.0 and the X-axis position and the Z-axis position reach the positions P3 "3.000" and "0.000", respectively, at the reference value L=200.0.

Although machining is performed according to such a tool path, since the velocity changes abruptly at the point of origin, the positions P1 and P2, and the position P3, shocks may occur and streaks may appear on a finished surface of a work piece.

In order to eliminate this problem, according to Japanese Patent Application Publication No. 2003-303005 and Japanese Patent Application Publication No. 2007-304714, the command positions are connected by quadratic to quintic function curves, and the tool is moved along the curves to thereby prevent the occurrence of shocks and to obtain a smooth finished surface. However, in the methods disclosed in Japanese Patent Application Publication No. 2003-303005 and Japanese Patent Application Publication No.

2007-304714, although a smooth finished surface can be obtained since a command tool path is corrected by connecting all command positions by quadratic to quintic function curves, users have to correct the path table data in order to apply the methods to existing path table data.

SUMMARY OF THE INVENTION

Therefore, an object of the present invention is to provide a numerical controller having a smoothing function of limiting a correction range of a tool path without the need of users to correct existing path table data by themselves in table format data (path table data)-based operations of a machine tool to thereby obtain a smooth finished surface while maintaining the designated tool path as much as possible.

The present invention provides a numerical controller having a smoothing function in table format data-based operations, configured to, use time, a axis position, or a spindle position as a reference value, store positions of a plurality of axes synchronized with the reference value as command data in table format in a memory or a storage device connected by a network so as to correspond to the reference value, read the table format data sequentially, and control the positions of an axis synchronized with the reference value in a synchronized manner, the numerical controller including: a table format data prefetching unit configured to prefetch the table format data of the plurality of axes to be synchronized in parallel; a tool path calculating unit configured to calculate a tool path using the prefetched table format data; a velocity changing point detecting unit configured to detect velocity changing points in the tool path; a correction range designating unit configured to designate a correction range at the velocity changing point, by a distance from the velocity changing point; a boundary position calculating unit configured to calculate two boundary positions before and after the velocity changing point on the tool path, the positions being located inside and outside the correction range; a tool path correcting unit configured to connect the calculated two boundary positions before and after the velocity changing point by a smooth tool path; and a table format data correcting unit configured to correct the table format data based on the corrected tool path.

The tool path correcting unit may connect the two boundary positions by a smooth curved tool path by using a multidimensional function, a trigonometric function, or a combination thereof.

The correction range designating unit may designate the distance from the velocity changing point as a parameter, or by using an input signal or a program command.

When the tool path is present on a 2-dimensional plane, the boundary position calculating unit may calculate, as the boundary positions, intersection points between the tool path and a circle having a radius corresponding to the designated distance and centered on the velocity changing point. When the tool path is present in a 3-dimensional space, the boundary position calculating unit may calculate, as the boundary positions, intersection points between the tool path and a spherical surface having a radius corresponding to the designated distance and centered on the velocity changing point.

The numerical controller may further include a correction range adjusting unit configured to adjust a radius of the correction range to half a distance between the velocity changing points when the correction range designated by the correction range designating unit overlaps with correction ranges before and after the correction range.

The table format data prefetching unit may read subsequent command data of an axis having a smallest reference value among reference values of the respective items of command data that have been sequentially read.

With the above-described configuration, a small range near the velocity changing point, of the tool path designated in the table format data is corrected to obtain a smooth tool path. Due to this, it is possible to prevent the occurrence of shocks resulting from an abrupt change in velocity and to obtain a smooth finished surface. Moreover, the correction range of the tool path is small, and the respective axes are driven by synchronizing the other data outside the small correction range with the command reference values in the table format data before correction. Thus, synchronization between the reference values and the respective axes is maintained completely.

Since the table format data is automatically corrected by the numerical controller when users designates the correction range, the present invention can be applied to existing table format data.

BRIEF DESCRIPTION OF THE DRAWINGS

The above and other objects and features of the present invention will be apparent from the following description of embodiments with reference to the accompanying drawings, in which:

FIG. 1 is a control block diagram showing when a machine tool is operated based on table format data;

FIG. 2 is an example of command data stored in a path table in the block diagram of FIG. 1;

DETAILED DESCRIPTION OF THE PREFERRED EMBODIMENTS

First, an overview of operation control according to an embodiment of the present invention will be described. In the present embodiment, path tables of all axes associated with a tool path to be synchronized are read in advance in parallel to calculate the tool path, a velocity changing point is detected, and a portion of the tool path within a predetermined range before and after the velocity changing point is corrected. In operations based on table format data, since it is very important to synchronize a reference value with a coordinate value of an axis to be synchronized with the reference value, it is necessary to guarantee that synchronization is maintained after correction. Due to this, a range (correction range) where correction is performed is limited to a predetermined distance from the velocity changing point, and synchronization between the reference value and the coordinate values of respective axes is maintained completely for the other positions where correction is not performed.

Figure 3:
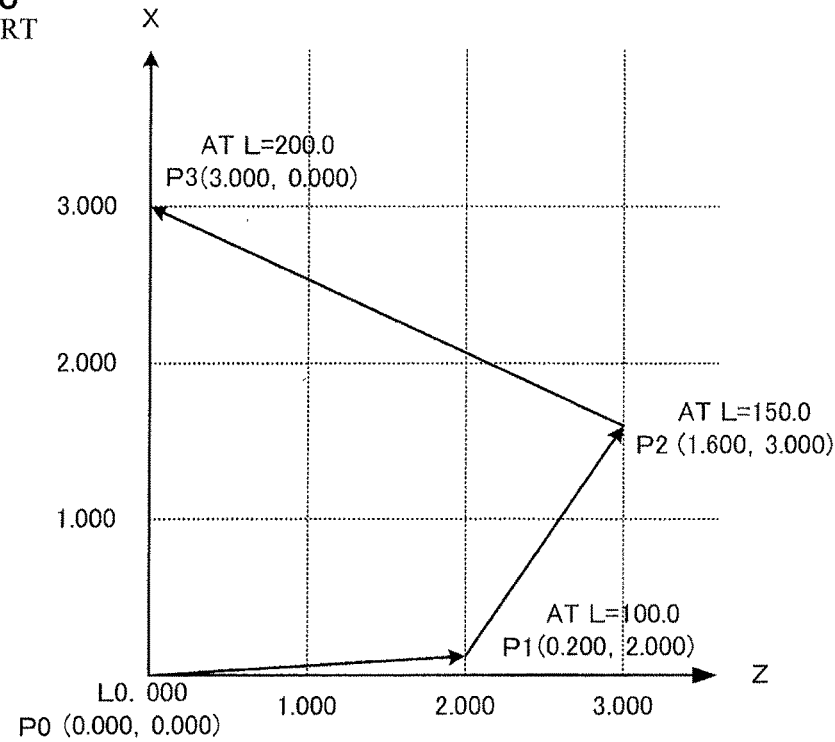
FIG. 3 is an explanatory diagram of a tool path based on the command data stored in the path table illustrated in FIG. 2.

In operations based on table format data according to the related art illustrated in FIG. 1, a tool path before correction based on the path table data stored in the X-axis path table Tx and the Z-axis path table Tz illustrated in FIG. 2 is as illustrated in FIG. 3 as described above. In this tool path, the velocity may change at certain command points (reference values L=0.0, L1=100.0, L2=150.0, and L3=200.0) in any one of the X-axis path table Tx and the Z-axis path table Tz associated with the tool path. Whether there is a change in the velocity actually can be determined by comparing velocity components before and after the command point. For example, in the example illustrated in FIGS. 2 and 3, if the reference value is time (msec) and the X-axis and Z-axis positions are in units of "mm," the X-axis and Z-axis velocity components before and after the reference value L=100.0 are calculated as follows. When the reference value is another axis position such as a spindle position, the X-axis and Z-axis velocity components are calculated as the velocity components corresponding to the reference value.

Velocity before $L$=100.0(Position $P1$)

X-axis component=0.200 (mm)/100 (msec)=0.002 (mm/msec)

The Z-axis component is in the course of moving so as to reach 3.000 (mm) at L=150.0 (msec). Thus, Z-axis component=3.000 (mm)/150.0 (msec)=0.020 (mm/msec).

Velocity after $L$=100.0

X-axis component=2.800 (mm)/100 (msec)=0.028 (mm/msec)

The Z-axis component is not changed. Thus,

Z-axis component=3.000 (mm)/150.0 (msec)=0.020 (mm/msec).

Since the X-axis components before and after the reference value L=100.0 are different, it can be determined that the position P1 is a velocity changing point. In this manner, by comparing the velocity components before and after a command point, it is possible to determine whether a certain point is a velocity changing point.

Figure 4:
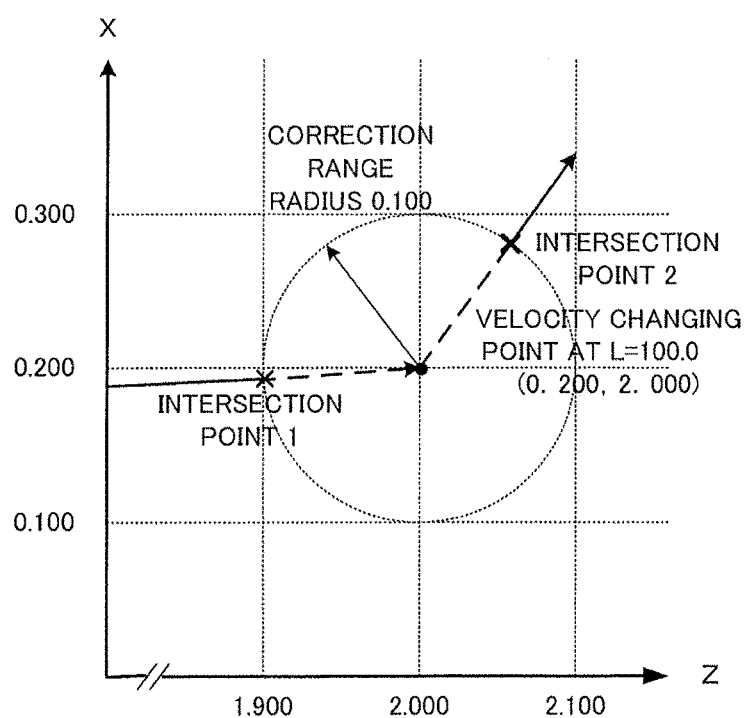
FIG. 4 is an explanatory diagram of intersection points of a correction range circle and a tool path, determining the starting point and the ending point of a correction range.

Subsequently, only a predetermined range around a velocity changing point is corrected in order to limit a correction range where the tool path before and after the velocity changing point is corrected. The correction range is defined by designating a radius r, calculating intersection points between the tool path and a circle having the radius r, and using a range between the intersection points as the correction range. That is, the intersection points indicate boundary positions on the tool path between an area inside the correction range and an area outside the correction range, and calculating the intersection points leads to that the boundary positions are calculated. For example, when a correction range (radius r) is 0.100, a circle depicted by a broken line in FIG. 4 is a correction range at the reference value L=100.0 (velocity changing point P1).

An intersection point 1 is calculated as an intersection point between a straight line connecting a velocity changing point P0 (X=0.000, Z=0.000) and a velocity changing point P1 (X=0.200, Z=2.000) and a circle having the radius 0.100 and centered on the velocity changing point P1 (X=0.200, Z=2.000), and an intersection point 2 is calculated as an intersection point between the circle and a straight line connecting the velocity changing point P1 (X=0.200, Z=2.000) and a position P2 (X=1.600, Z=3.000) which is the next velocity changing point.

Coordinate ($X,Z$) of Intersection point 1= (0.1900496 . . . ,1.9004963 . . . )

The reference value L at the point in time when the tool reaches the intersection point 1 is calculated as a value at which the Z-axis position reaches the Z-axis coordinate value 1.9004963 . . . of the intersection point 1 since the Z-axis position changes from 0.000 to 2.000 proportionally with the reference value changing from L=0.0 to L=100.0.

Reference value $L$ of Intersection point 1=1. 9004963 . . . ×100/2.000=95.0248140 . . . (msec)

Similarly,

Coordinate ($X,Z$) of Intersection point 2= (0.2813733 . . . , 2.0581238 . . . )

Reference value $L$ of Intersection point 2= 2.0581238 . . . ×50/1.00=102.9061910 . . . (msec)

Subsequently, an X-axis tool path of which the starting point and the ending point are the intersection points 1 and 2 of the boundary positions calculated in this manner is added to the command data of the X-axis path table Tx to correct the X-axis path table Tx. Hereinafter, a tool path of which the starting point and the ending point are defined as commands is referred to a path. Since the intersection point 1 is present on a line (path) that connects the velocity changing point P0 (X=0.000, Z=0.000) and the velocity changing point P1 (X=0.200, Z=2.000), the X-axis velocity of the path from the velocity changing point P0 (L=0.000, X=0.000) to the intersection point (L=95.0248140 . . . , X=0.1900496 . . . ) is the same speed (0.002 mm/msec) as before, and the path from the intersection point 1 (L=95.0248140 . . . , X=0.1900496 . . . ) to the intersection point 2 (L=102.9061910 . . . , X=0.2813733 . . . ) is connected by such a cubic function that the initial velocity is the X-axis velocity (0.002 mm/msec) of the previous path at the intersection point and the final velocity is the X-axis velocity (0.028 mm/msec) of the path from the velocity changing point P1 to the velocity changing point P2. Moreover, in the path from the intersection point 2 (L=102.9061910 . . . , X=0.2813733 . . . ) to the velocity changing point P2 (L=150.0, X=1.600), the tool moves at the same speed (0.028 mm/msec) as defined in the previous path from the velocity changing point P1 to the velocity changing point P2. The command data of the X-axis path table in which the path from the intersection point 1 to the intersection point 2 is added is as illustrated in FIG. 5 (FIG. 5 illustrates the data of added and corrected positions).

Moreover, when there is a change in the Z-axis velocity before and after a correction target velocity changing point, the command data of the Z-axis path table Tz is also corrected in the same manner. In the above-described example, since the Z-axis velocity is 0.020 mm/msec and does not change before and after the correction target velocity changing point P1, the command data of the Z-axis path table Tz is not corrected.

Since a technique of connecting two points by a cubic function in table format data-based operations is disclosed in Japanese Patent Application Publication No. 2003-303005 and is known, the description thereof will not be provided. Moreover, two points may be connected by a more complex function such as a quartic function or a quintic function. In this case, when there is a change in an acceleration between two points, the acceleration is changed continuously. Moreover, a tool path may be corrected so as to pass through velocity changing points. A technique of connecting two points by such a quartic function or a quintic function in operations based on table format data is disclosed in Japanese Patent Application Publication No. 2007-304714 and is known. Further, as a similar correction method, a method which uses a trigonometric function and a method which uses a plurality of combinations of functions may be used.

Figures 5, 6:
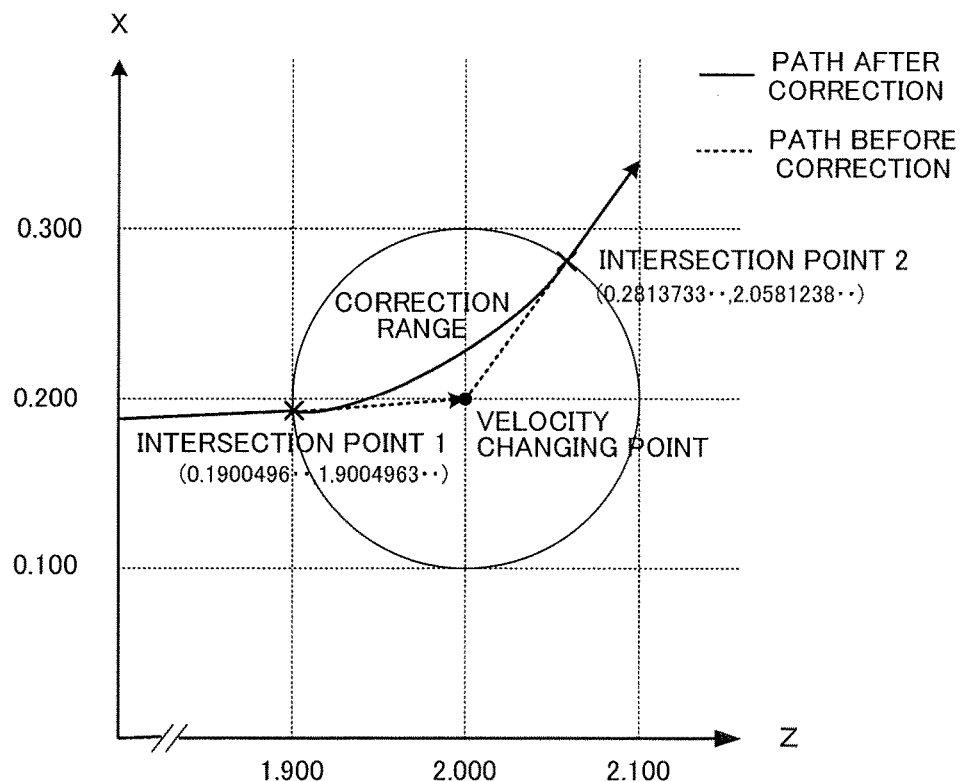
FIG. 5 is a diagram illustrating an example of command data of a corrected path table.
FIG. 6 is an explanatory diagram of a corrected tool path.

When operations based on table format data are performed using the path table corrected in this manner, the tool path in the correction range is corrected smoothly as illustrated in FIG. 6, and as for the non-correction target tool path, synchronization between the reference values L and the respective axis coordinate values is maintained completely as in the conventional art.

Although correction at the velocity changing point P1 (the reference value L=100.0) has been described, the same correction is performed at all velocity changing points. Moreover, the correction range may be changed dynamically by designating the radius r of the correction range as a parameter or designating the same by using a program command, an input signal, or the like as necessary. Further, when a series of velocity changing points appear in a very small range, the correction ranges may overlap with each other. In order to obviate this, the value of the radius r of the correction range is adjusted. For example, the radius of the correction range is adjusted in the following manner.

In the case where Command radius r≤0.5×Distance between velocity changing points, the value of the command radius r is used as it is.

In the case where Command radius r>0.5×Distance between velocity changing points, the radius value to be used is adjusted to "0.5×Distance between velocity changing points".

Figure 7:
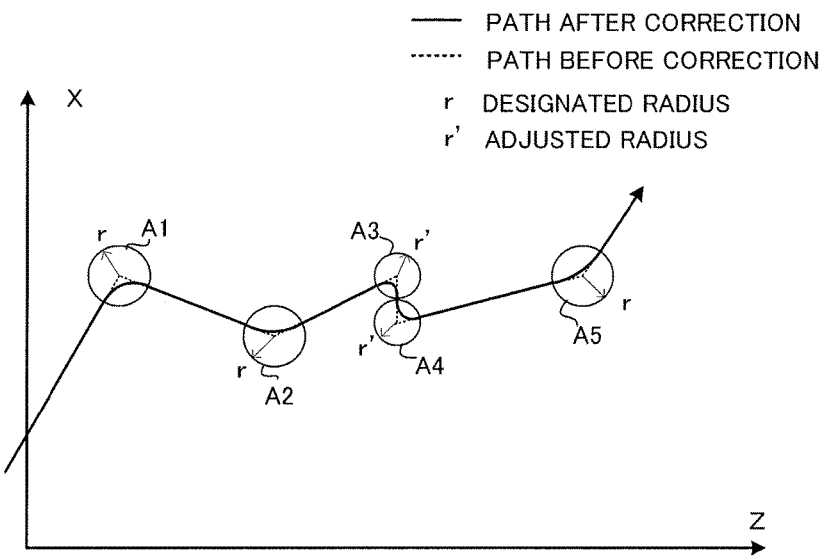
FIG. 7 is an explanatory diagram for describing an example of adjusting a radius value of a correction range.

FIG. 7 is an explanatory diagram of a tool path, showing when the correction range is adjusted in this manner. In correction ranges A1, A2, and A5, since the distance between velocity changing points is large and the distance is equal to or larger than twice the command radius r designated as parameter or by using a program command or an input signal, the command radius r is used as the radius of the correction range. However, in correction ranges A3 and A4, since the distance between velocity changing points is smaller than twice the command radius r, ½ of the distance D between velocity changing points is used as the radius r' of the correction range (that is, r'=0.5D).

In the above description, although a velocity changing point is defined as a point at which a moving direction changes, a point at which a moving direction does not change but an absolute value (that is, the speed) of a velocity changes (for example, an X-axis velocity component and a Z-axis velocity component change at the same ratio and a combined velocity of the X-axis and Z-axis components changes) may be defined as the velocity changing point, and the same correction as described above may be performed. By doing so, it is possible to suppress the occurrence of shocks and an adverse effect on finished surface quality due to an abrupt velocity change.

Moreover, the present embodiment can be applied to a 3-dimensional space and can be applied to 3-dimensional machining according to table format data-based operations.

Figure 8:
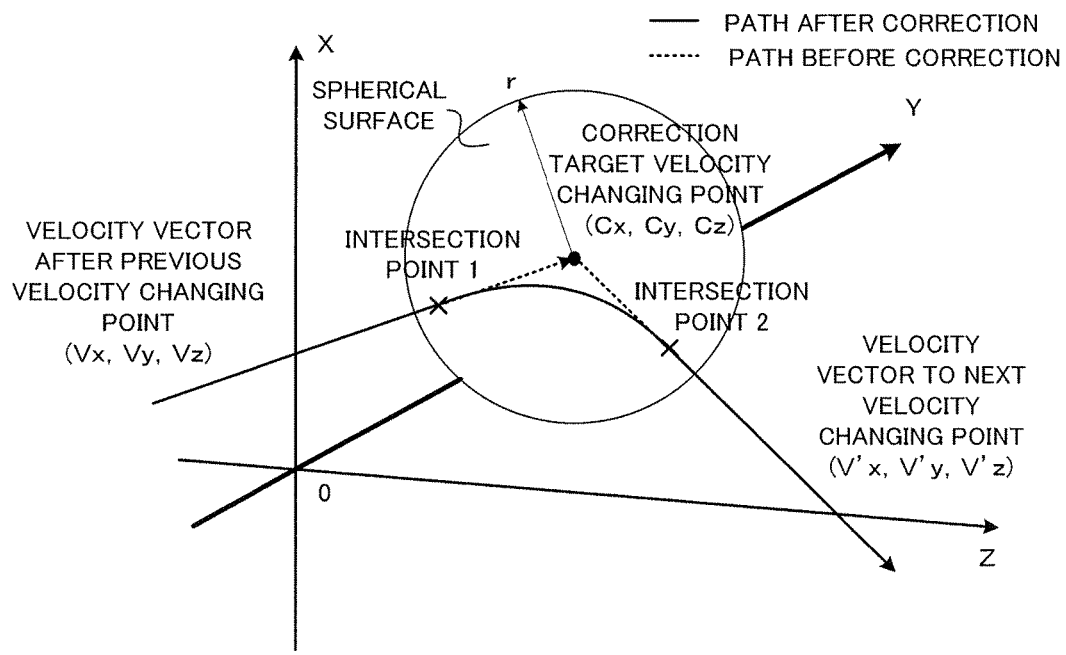
FIG. 8 is an explanatory diagram of intersection points of a tool path and a spherical surface of a correction range in a 3-dimensional space.

FIG. 8 is an explanatory diagram of correction of a tool path before and after a velocity changing point in a 3-dimensional space of X, Y, and Z-axes.

(Cx, Cy, Cz) is the XYZ coordinate of a correction target velocity changing point.

(Vx, Vy, Vz) is a velocity vector from a previous velocity changing point of the correction target velocity changing point.

(V'x, V'y, V'z) is a velocity vector to a next velocity changing point of the correction target velocity changing point.

In this case, a straight line connecting the previous velocity changing point and the correction target velocity changing point is expressed by Expression (1) below.

$$(X,Y,Z)=(Cx,Cy,Cz)+t(Vx,Vy,Vz) \quad (1)$$

Thus, the coordinate value (X, Y, Z) of a point on the straight line is expressed by Expression (2) below.

$$(X,Y,Z)=(Cx+t\cdot Vx, Cy+t\cdot Vy, Cz+t\cdot Vz) \quad (2)$$

A correction range is designated by a spherical surface having the radius r, and the spherical surface centered on the correction target velocity changing point (Cx, Cy, Cz) is expressed by Expression (3) below.

$$(X-Cx)^2+(Y-Cy)^2+(Z-Cz)^2=r^2 \quad (3)$$

When the coordinate value (X, Y, Z) of the point on the straight line defined in Expression (2) is substituted into Expression (3), the value of "t" at intersection points (boundary positions) between the straight line and the spherical surface is calculated as defined in Expression (4).

$$t=\pm r/[(\sqrt{(Vx^2+Vy^2+Vz^2)}] \quad (4)$$

Although two intersection points between the straight line and the spherical surface are calculated as defined in Expression (4), since the intersection point 1 on a straight line extending from the previous velocity changing point to the correction target velocity changing point is present closer to the negative side of the vector than the correction target velocity changing point, the value of "t" of the intersection point 1 is expressed by Expression (5) below.

$$t=-r/[(\sqrt{(Vx^2+Vy^2+Vz^2)}] \quad (5)$$

Thus, when "t" in Expression (5) is substituted into Expression (2), the coordinate value of the intersection point 1 is expressed as Expression (6) below.

$$(X, Y, Z) = \left( Cx - \frac{r\cdot Vx}{\sqrt{(Vx^2+Vy^2+Vz^2)}} \cdot Cy - \frac{r\cdot Vy}{\sqrt{(Vx^2+Vy^2+Vz^2)}} \cdot Cz - \frac{r\cdot Vz}{\sqrt{(Vx^2+Vy^2+Vz^2)}} \right) \quad (6)$$

The value of "t" and the coordinate value at the intersection point 2 are calculated similarly. Since the intersection point 2 is present closer to the positive side of the vector than the correction target velocity changing point, the value of "t" at the intersection point 2 is expressed by Expression (7) below, and the coordinate value of the intersection point 2 is expressed by Expression (8) below.

$$t = r / \left[ \left( \sqrt{(V'x^2 + V'y^2 + V'z^2)} \right) \right] \quad (7)$$

$$(X, Y, Z) = \left( Cx + \frac{r \cdot V'x}{\sqrt{(V'x^2 + V'y^2 + V'z^2)}} \cdot Cy + \frac{r \cdot V'y}{\sqrt{(V'x^2 + V'y^2 + V'z^2)}} \cdot Cz + \frac{r \cdot V'z}{\sqrt{(V'x^2 + V'y^2 + V'z^2)}} \right) \quad (8)$$

Moreover, the values of the reference values L at which the tool reaches the intersection points 1 and 2 are calculated as values obtained by adding the respective "t" values to the reference value at the correction target velocity changing point.

In this manner, the reference values and the coordinate values of the X-axis, Y-axis, and Z-axis path tables at the intersection points 1 and 2 which are the boundary positions are calculated. Thus, similarly to correction in a 2-dimensional plane, the tool path is corrected so that the intersection points 1 and 2 in the path tables are connected smoothly by a curve using a multidimensional function or a trigonometric function or a combination thereof.

In order to correct a tool path at velocity changing points, it is necessary to correct the data of path tables before executing the command data stored in the path tables and to prefetch the path tables. Prefetching of path tables involves reading the reference values L=0 from the respective axis path tables, reading subsequent command data of an axis of which the reference value is smallest among the read reference values, and reading the command data if the smallest reference value is assigned to a plurality of axes (if the same reference value is assigned to a plurality of axes). When prefetching is performed at least three times in this method, the command data of three reference values is read, and an axis for which three reference values are read may become a velocity changing point at a previous reference value of the last reference value. For example, when the reference values L0, L1, and L2 are read from only the path table of one certain axis (for example, X-axis) with three times of prefetching, since it is possible to know tool paths (paths) for the reference values L0 to L1 and L1 to L2, it is also possible to determine whether the point corresponding to the reference value L1 is a velocity changing point. In this case, since the other axis (for example, Y-axis and Z-axis) positions are moving at the reference value L1, there is no change in the velocity. Moreover, when the reference value L1 is read for the other axes with the second prefetch (that is, the same reference value L1 is assigned to a plurality of axes), since the next command data is read for the axes, it is possible to know the path before and after the reference value L1 and to determine whether the reference value L1 is a velocity changing point. After that, whenever each prefetch is performed, it is possible to determine whether there is a change in the velocity at the reference values L2, L3, . . . , and so on. Here, L0<L1<L2<L3< . . . .

In this case, as illustrated in FIG. 7, it is necessary to determine whether a series of velocity changing points appear at very small intervals by determining whether a correction range of one velocity changing point overlaps with a correction range of a velocity changing point before and after the velocity changing point. Thus, two or more non-corrected velocity changing points are calculated, and a correction range of a velocity changing point at which the reference value is the smallest is determined. When a command which does not involve a change in velocity is included in the prefetch result, since such a command has no influence on the path, the command is deleted, and prefetching is performed continuously. After that, whenever the next velocity changing point is read, a tool path at a velocity changing point having the next smaller reference value is corrected.

Figure 9:
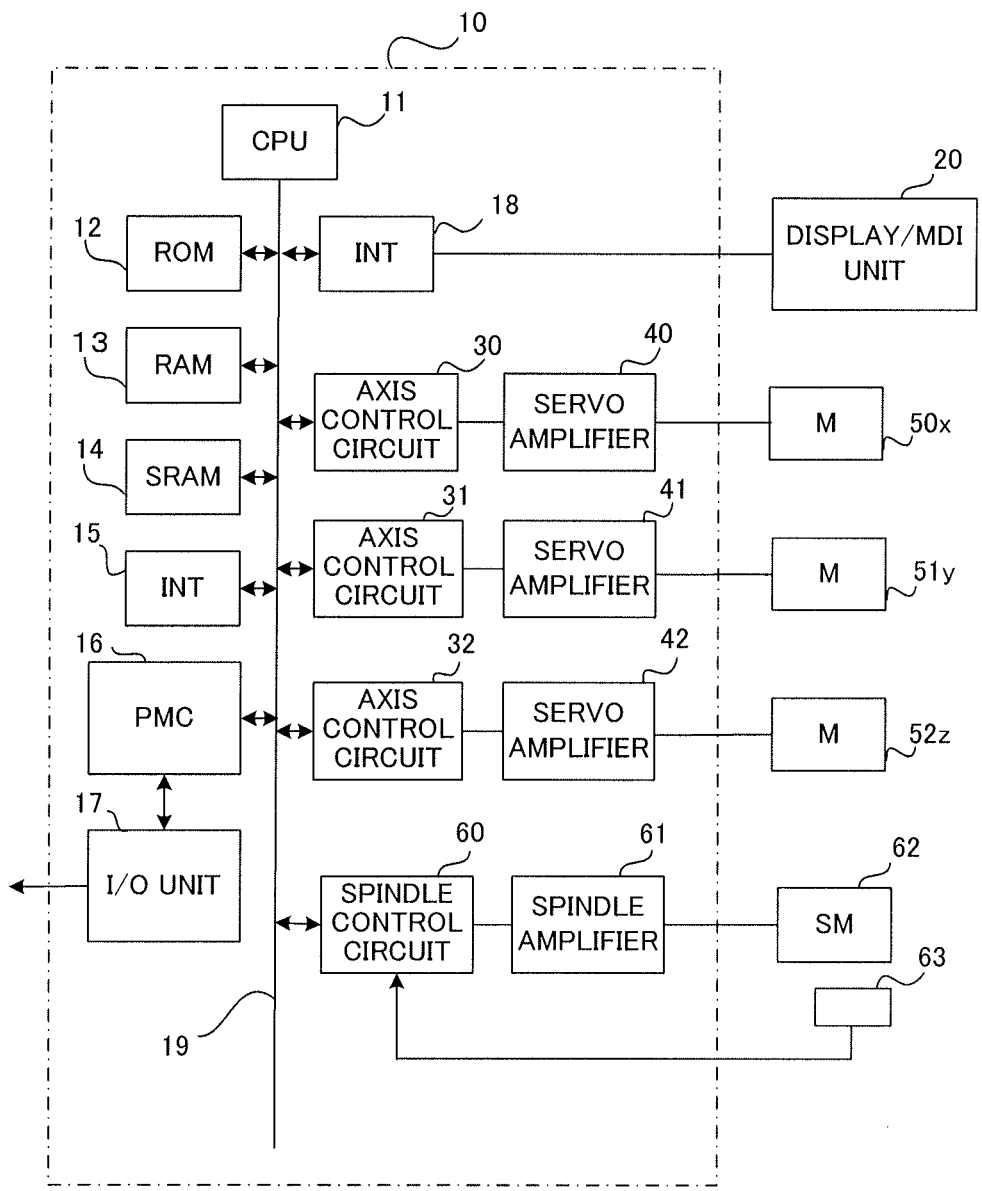
FIG. 9 is a block diagram of major parts of a numerical controller that executes path table-based operations according to an embodiment of the present invention.

FIG. 9 is a block diagram of major parts of a numerical controller that executes path table-based operations according to an embodiment of the present invention. A CPU 11 is a processor that controls an entire numerical controller 10. The CPU 11 reads a system program stored in a ROM 12 via a bus 19 and controls the entire numerical controller 10 according to the system program. A RAM 13 stores temporary computation data, display data, and various types of data input by an operator via a display/MDI unit 20. A SRAM 14 is configured as a nonvolatile memory which is backed up with a battery (not illustrated) and in which a storage device is maintained even when the numerical controller 10 is turned off.

The above-described respective items of table format data (that is, path tables) are stored in advance in the SRAM 14. In the present embodiment, the path table data may be stored in an external memory connected by a network, for example, rather than the storage device in the numerical controller, and the path table data may be sequentially read via the network.

An interface 15 enables the numerical controller 10 to connect to an external apparatus (not illustrated). A programmable machine controller (PMC) 16 outputs a signal to an auxiliary device such as an actuator of a machine tool via an I/O unit 17 according to a sequence program installed in the numerical controller 10 to control the auxiliary device. Moreover, the PMC 16 receives signals from various switches of an operating panel provided in the main body of a machine tool, processes the signals, and then, delivers the signals to the CPU 11.

The display/MDI unit 20 is a manual data input device including a display, a keyboard, and the like, and the interface 18 receives commands and data from the keyboard of the display/MDI unit 20 and delivers the commands and data to the CPU 11.

Axis control circuits 30, 31, and 32 of respective feed axes receive movement commands for respective feed axes from the CPU 11 and output the commands for respective feed axes to servo amplifiers 40, 41, and 42, respectively. The servo amplifiers 40, 41, and 42 receive these commands to drive servo motors 50x, 51y, and 52z of respective feed axes, respectively. The servo motors 50x, 51y, and 52z of respective feed axes have position/velocity detectors (not illustrated), feed position and velocity feedback signals from the position/velocity detectors back to the axis control circuits 30, 31, and 32 to perform position/velocity feedback control. In FIG. 9, the position/velocity feedback is not illustrated.

Moreover, a spindle control circuit 60 receives a spindle rotation command and outputs a spindle velocity signal to a spindle amplifier 61. The spindle amplifier 61 receives the spindle velocity signal to cause a spindle motor 62 to rotate at the command rotation speed. A position coder 63 feeds a feedback pulse (reference pulse) and one-revolution signal back to the spindle control circuit 60 in synchronization with rotation of the spindle motor 62 to perform velocity control. The feedback pulse (reference pulse) and one-revolution signal are read by the CPU 11 with the aid of the spindle control circuit 60, and, when the reference value is a spindle position, the feedback pulse (reference pulse) is counted by a counter (corresponding to the reference value counter in FIG. 1) provided in the RAM 13 and is used as a reference value. A spindle command pulse may be counted and be used as a reference value.

When the reference value is time, the counter provided in the RAM 13 counts the number of time signal pulses obtained from a counting function of the numerical controller 10 and uses the counted number as the reference value. Alternatively, when the reference value is a feed axis position, the number of pulses obtained from a feedback signal from the feed axis (in this example, the X-axis or the Z-axis) is counted and is used as a reference value when executing path table-based operations. Alternatively, the number of feed axis command pulses may be counted and be used as the reference value.

Figure 10:
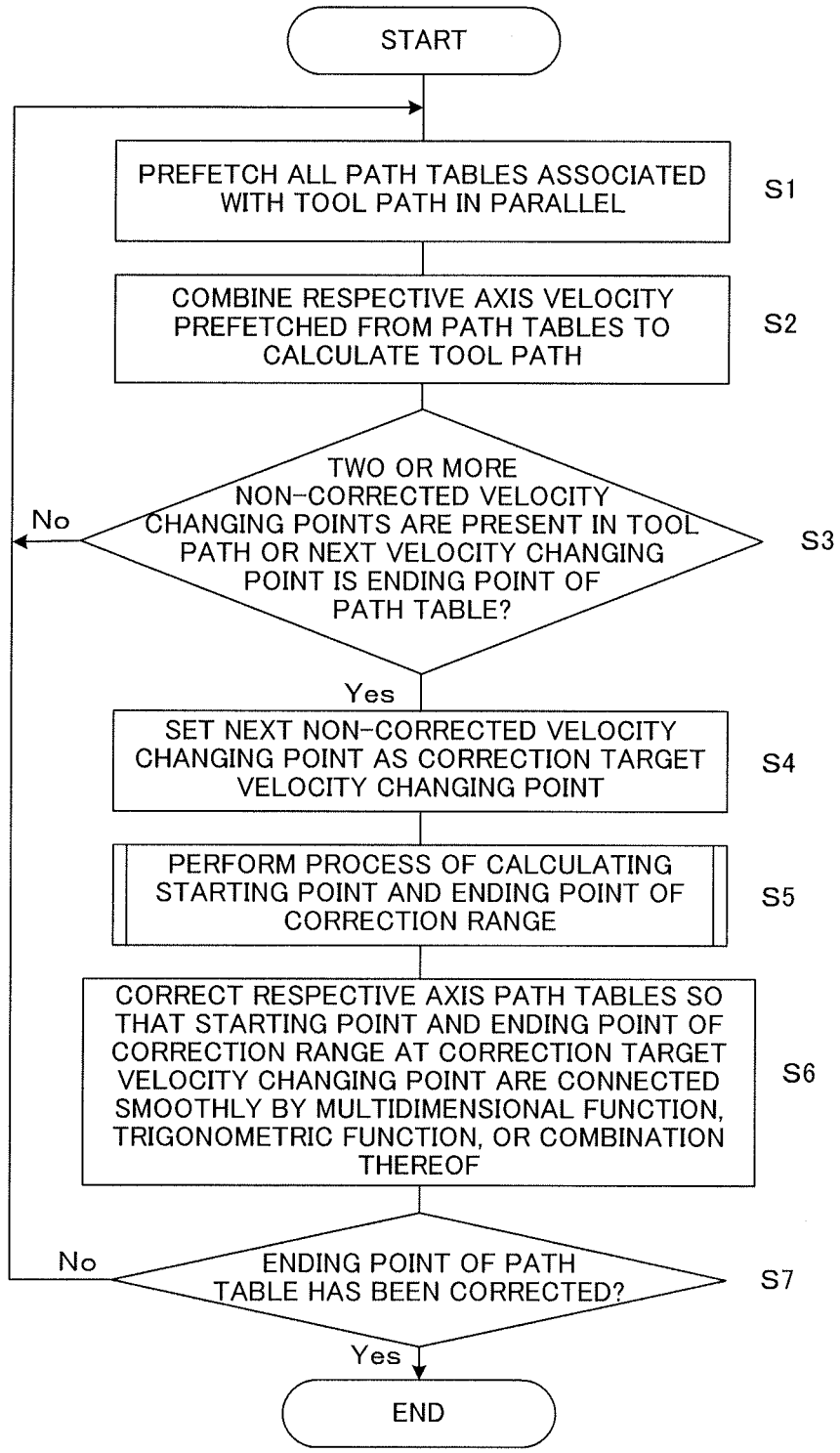
FIG. 10 is a flowchart illustrating an algorithm of a table format data correction process according to an embodiment of the present invention.
Figure 11:
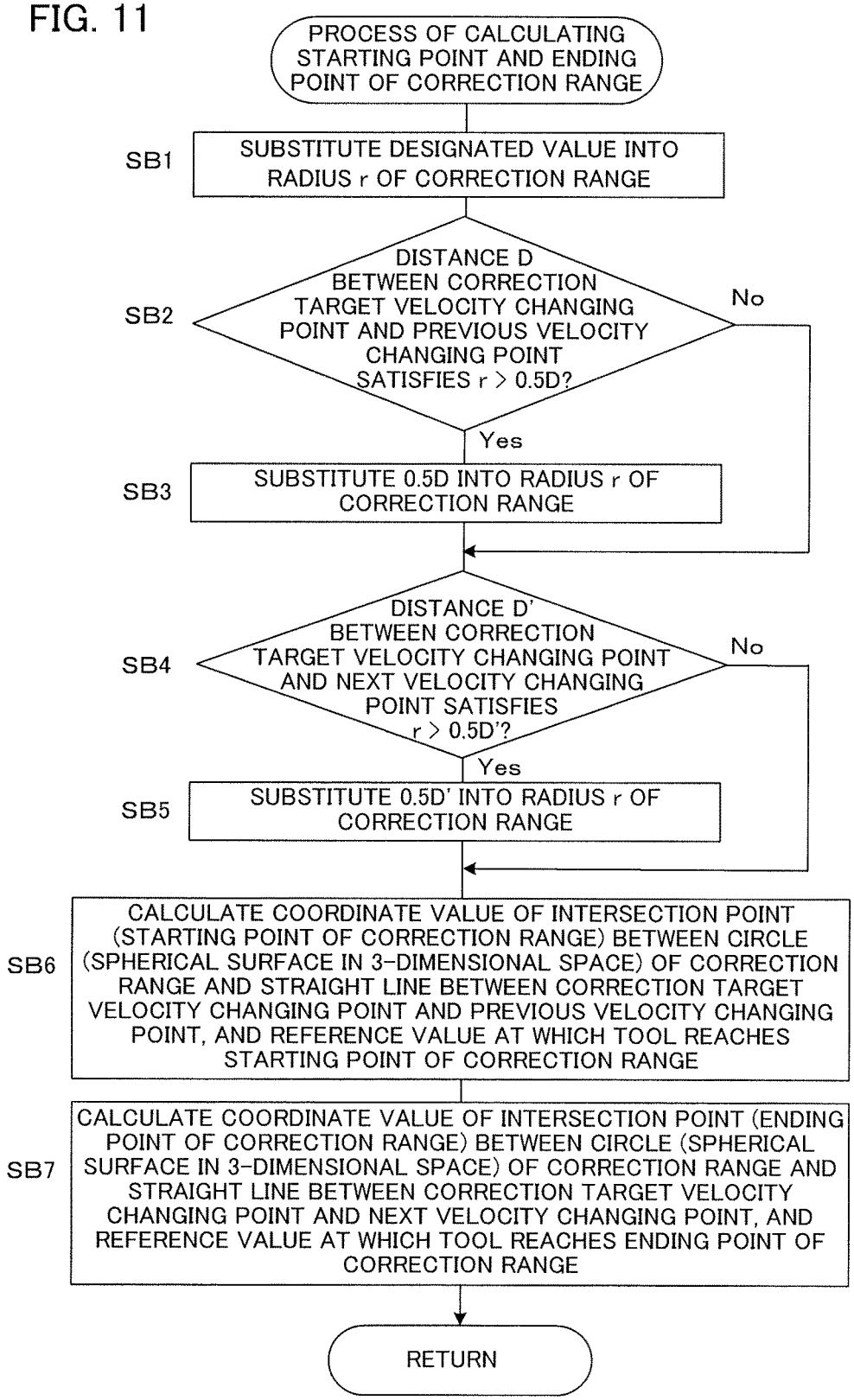
FIG. 11 is a flowchart illustrating an algorithm of a process of calculating the starting point and the ending point of a correction range in the table format data correction process.

FIGS. 10 and 11 are flowcharts illustrating an algorithm of a path table data correction process.

First, all path tables associated with a tool path are prefetched in parallel (step S1). The velocities of respective axes prefetched from the path tables are combined to calculate a tool path (step S2). It is determined whether two or more non-corrected velocity changing points are present in the tool path or whether the next velocity changing point is the ending point of a path table (step S3). When two or more non-corrected velocity changing points are not present, the flow returns to step S1. As the result of prefetching, when two or more non-corrected velocity changing points are present, a velocity changing point having the smaller reference value among the non-corrected velocity changing points is set as a correction target velocity changing point (step S4). Subsequently, a process of calculating the starting point and the ending point of a correction range of the set correction target velocity changing point is executed (step S5). The process of calculating the starting point and the ending point of the correction range is the process illustrated in FIG. 11, and will be described later.

When the starting point and the ending point of the correction range are calculated, the respective axis path tables are corrected so that the starting point and the ending point of the correction range at the correction target velocity changing point are connected smoothly by a multidimensional function, a trigonometric function, or a combination thereof (step S6).

After that, it is determined whether the ending point of the path table has been read and the ending point of the path table has been corrected (step S7). If the correction is not completed, the flow returns to step S1 and the processes subsequent to step S1 are performed. When the ending point of the path table has been read and corrected, this process ends.

The process of calculating the starting point and the ending point of the correction range in step S5 is the process illustrated in FIG. 11. First, the value designated as a parameter or designated by using a program command or an input signal is substituted into the radius r of the correction range (step SB1).

After that, it is determined whether the radius r of the correction range is larger than ½ of the distance D between the correction target velocity changing point and the previous velocity changing point (step SB2). That is, it is determined whether the correction range to be set overlaps with the correction range of the previous velocity changing point. When the radius r of the correction range is equal to or smaller than 0.5D, the flow proceeds to step SB4. When the radius r of the correction range is larger than 0.5D, the radius r of the correction range is changed to 0.5D (step SB3). Subsequently, it is determined whether the radius r of the correction range is larger than ½ of the distance D' between the correction target velocity changing point and the next velocity changing point (step SB4). This is to determine whether the correction range to be set overlaps with the correction range of the next velocity changing point. When the radius r of the correction range is equal to or smaller than 0.5D', the flow proceeds to step SB6. When the radius r of the correction range is larger than 0.5D', the radius r of the correction range is changed to 0.5D' (step SB5).

The coordinate value of an intersection point between the correction range of the circle, or a spherical surface in a 3-dimensional space, having the radius r calculated in this manner and a straight line between the correction target velocity changing point and the previous velocity changing point is calculated, and this coordinate value is used as the starting point of the correction range. Moreover, a reference value L at which the tool reaches the coordinate value (the starting point of the correction range) of the intersection point is calculated, and the calculated reference value is used as the reference value at the starting point of the correction range (step SB6).

The coordinate value of an intersection point between the correction range of the circle, or a spherical surface in a 3-dimensional space, having the radius r calculated in this manner and a straight line between the correction target velocity changing point and the next velocity changing point is calculated, and this coordinate value is used as the ending point of the correction range. Moreover, a reference value L (the reference value at the ending point of the correction range) at which the tool reaches the coordinate value (the ending point of the correction range) of the intersection point is calculated (step SB7), and the flow returns to the process (step S6) illustrated in FIG. 10.

Although the process of correcting the path table command data has been described with reference to FIGS. 10 and 11, the path table-based operations may be executed after the process of correcting the path table command data has been completed. Moreover, path table-based operations may be executed using the corrected path table command data while prefetching the path table command data in FIGS. 10 and 11.

In this case, if the correction process lags behind the execution process, a technique of stopping the counting of the reference value or performing standby as disclosed in Japanese Patent Application Publication No. 2012-234445 may be used.

What is claimed is:

1. A numerical controller for smoothing tool path in operations based on table format data, configured to
use time, an axis position, or a spindle position as a reference value,
store positions of a plurality of axes synchronized with the reference value as command data in table format in a memory or a storage device connected by a network so as to correspond to the reference value,
read the table format data sequentially, and
control the positions of an axis synchronized with the reference value in a synchronized manner, the numerical controller comprising:
a table format data prefetching unit configured to prefetch the table format data of the plurality of axes to be synchronized in parallel;
a tool path calculating unit configured to calculate a tool path using the prefetched table format data;
a velocity changing point detecting unit configured to detect velocity changing points in the tool path;
a correction range designating unit configured to designate a correction range at the velocity changing point, by a distance from the velocity changing point;
a boundary position calculating unit configured to calculate two boundary positions before and after the velocity changing point on the tool path, the positions being located inside and outside the correction range;
a tool path correcting unit configured to connect the calculated two boundary positions before and after the velocity changing point by a smooth tool path; and
a table format data correcting unit configured to correct the table format data based on the corrected tool path.

2. The numerical controller for smoothing tool path in operations based on table format data according to claim 1, wherein
the tool path correcting unit is further configured to connect the boundary positions by a multidimensional function, a trigonometric function, or a combination thereof.

3. The numerical controller for smoothing tool path in operations based on table format data according to claim 1, wherein
the correction range designating unit is further configured to designate the distance from the velocity changing point, as a parameter, or by using an input signal or a program command.

4. The numerical controller for smoothing tool path in operations based on table format data according to claim 1, wherein
the boundary position calculating unit is further configured to calculate, when the tool path is present on a 2-dimensional plane, as the boundary positions, intersection points between the tool path and a circle having a radius corresponding to the designated distance and centered on the velocity changing point, and
calculate, when the tool path is present in a 3-dimensional space, as the boundary positions, intersection points between the tool path and a spherical surface having a radius corresponding to the designated distance and centered on the velocity changing point.

5. The numerical controller for smoothing tool path in operations based on table format data according to claim 1, further comprising:
a correction range adjusting unit configured to adjust a radius of the correction range to half a distance between the velocity changing points when the correction range designated by the correction range designating unit overlaps with correction ranges before and after the correction range.

6. The numerical controller for smoothing tool path in operations based on table format data according to claim 1, wherein
the table format data prefetching unit is configured to read subsequent command data of an axis having a smallest reference value among reference values of the respective items of command data sequentially read.

7. The numerical controller for smoothing tool path in operations based on table format data according to claim 2, wherein
the correction range designating unit is further configured to designate the distance from the velocity changing point, as a parameter, or by using an input signal or a program command.

8. The numerical controller for smoothing tool path in operations based on table format data according to claim 2, wherein
the boundary position calculating unit is further configured to calculate, when the tool path is present on a 2-dimensional plane, as the boundary positions, intersection points between the tool path and a circle having a radius corresponding to the designated distance and centered on the velocity changing point, and
calculate, when the tool path is present in a 3-dimensional space, as the boundary positions, intersection points between the tool path and a spherical surface having a radius corresponding to the designated distance and centered on the velocity changing point.

9. The numerical controller for smoothing tool path in operations based on table format data according to claim 3, wherein
the boundary position calculating unit is further configured to calculate, when the tool path is present on a 2-dimensional plane, as the boundary positions, intersection points between the tool path and a circle having a radius corresponding to the designated distance and centered on the velocity changing point, and
calculate, when the tool path is present in a 3-dimensional space, as the boundary positions, intersection points between the tool path and a spherical surface having a radius corresponding to the designated distance and centered on the velocity changing point.

10. The numerical controller for smoothing tool path in operations based on table format data according to claim 2, further comprising:
a correction range adjusting unit configured to adjust a radius of the correction range to half a distance between the velocity changing points when the correction range designated by the correction range designating unit overlaps with correction ranges before and after the correction range.

11. The numerical controller for smoothing tool path in operations based on table format data according to claim 3, further comprising:
a correction range adjusting unit configured to adjust a radius of the correction range to half a distance between the velocity changing points when the correction range designated by the correction range designating unit overlaps with correction ranges before and after the correction range.

12. The numerical controller for smoothing tool path in operations based on table format data according to claim 4, further comprising:
a correction range adjusting unit configured to adjust a radius of the correction range to half a distance between the velocity changing points when the correction range designated by the correction range designating unit overlaps with correction ranges before and after the correction range.

13. The numerical controller for smoothing tool path in operations based on table format data according to claim 2, wherein
the table format data prefetching unit is configured to read subsequent command data of an axis having a smallest reference value among reference values of the respective items of command data sequentially read.

14. The numerical controller for smoothing tool path in operations based on table format data according to claim 3, wherein
the table format data prefetching unit is configured to read subsequent command data of an axis having a smallest reference value among reference values of the respective items of command data sequentially read.

15. The numerical controller for smoothing tool path in operations based on table format data according to claim 4, wherein
the table format data prefetching unit is configured to read subsequent command data of an axis having a smallest reference value among reference values of the respective items of command data sequentially read.

16. The numerical controller for smoothing tool path in operations based on table format data according to claim 5, wherein the table format data prefetching unit is configured to read subsequent command data of an axis having a smallest reference value among reference values of the respective items of command data sequentially read.

* * * * *